United States Patent
Yun

(10) Patent No.: US 7,305,218 B2
(45) Date of Patent: Dec. 4, 2007

(54) RF SWITCH

(75) Inventor: Jeong-Pil Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 541 days.

(21) Appl. No.: 10/746,731

(22) Filed: Dec. 23, 2003

(65) Prior Publication Data

US 2004/0162044 A1    Aug. 19, 2004

(30) Foreign Application Priority Data

Dec. 28, 2002    (KR)    ............... 10-2002-0085811

(51) Int. Cl.
 *H04B 1/06*    (2006.01)
 *H04B 7/00*    (2006.01)

(52) U.S. Cl. ............... 455/234.1; 455/239.1; 455/250.1; 455/242.1

(58) Field of Classification Search ............ 455/250.1, 455/234.1–249.1
See application file for complete search history.

(56) References Cited

U.S. PATENT DOCUMENTS

| | | | | |
|---|---|---|---|---|
| 3,920,931 A | * | 11/1975 | Yanick, Jr. ............ | 381/321 |
| 4,227,256 A | * | 10/1980 | O'Keefe ............... | 455/250.1 |
| 4,360,787 A | * | 11/1982 | Galpin ................ | 330/284 |
| 5,507,023 A | * | 4/1996 | Suganuma et al. ...... | 455/234.1 |
| 5,638,141 A | * | 6/1997 | Bae et al. ............ | 348/735 |
| 5,745,847 A | * | 4/1998 | Matsuo ................ | 455/234.1 |
| 5,862,465 A | * | 1/1999 | Ou .................... | 455/234.1 |
| 5,963,855 A | * | 10/1999 | Lussenhop et al. ...... | 455/226.2 |
| 5,999,578 A | * | 12/1999 | Ha .................... | 375/345 |
| 6,035,008 A | * | 3/2000 | Kim ................... | 375/345 |
| 6,107,878 A | * | 8/2000 | Black ................. | 330/129 |
| 6,177,964 B1 | * | 1/2001 | Birleson et al. ....... | 348/725 |
| 6,324,387 B1 | * | 11/2001 | Kamgar et al. ......... | 455/234.1 |
| 6,498,926 B1 | * | 12/2002 | Ciccarelli et al. ..... | 455/240.1 |
| 2004/0259516 A1 | * | 12/2004 | Hwang et al. .......... | 455/234.1 |
| 2005/0162570 A1 | * | 7/2005 | Hall et al. ........... | 348/735 |
| 2005/0181753 A1 | * | 8/2005 | Kim ................... | 455/194.2 |

FOREIGN PATENT DOCUMENTS

| | | | |
|---|---|---|---|
| JP | 402-268033 | * | 11/1990 |
| JP | 10-84500 | * | 3/1998 |
| JP | 2000-41199 | * | 2/2000 |
| JP | 10-2003-0004791 | * | 1/2003 |

* cited by examiner

*Primary Examiner*—Duc M. Nguyen
(74) *Attorney, Agent, or Firm*—Lee, Hong, Degerman, Kang & Schmadeka

(57) ABSTRACT

An RF switch is disclosed. Power of an amplifier installed in an RF switch of a TV receiver is adjusted by using a Schmitt trigger circuit. If an output voltage of an RF automatic gain controller of a tuner is greater than a pre-set upper limit threshold value, the amplifier is turned on, whereas if an output voltage of an RF automatic gain controller of a tuner is smaller than a pre-set lower limit threshold value, the amplifier is turned off. Thus, a signal distortion phenomenon that may occur when an infinitesimal signal, a strong signal and several signals with high power levels are adjacent to each other can be avoided, so a performance of a receiving unit is improved.

9 Claims, 3 Drawing Sheets

RF SWITCH

BACKGROUND OF THE INVENTION

1. Field of the Invention

The present invention relates to an RF switch and, more particularly, to an RF switch in which power of an amplifier is adjusted by a Schmitt trigger circuit.

2. Description of the Background Art

In general, an RF switch is a device for changing a path of an RF signal by an input signal of a user, and various models are used depending on its use.

FIG. 1 illustrates a general RF switch.

As shown in FIG. 1, the RF switch receives an air radio frequency (RF) signal or a cable radio frequency (RF) signal from an external source and transmits it to a tuner or a ¾ modulator.

That is, the RF switch includes two output terminals, and when the same signal is outputted through the two output terminals, one is inputted to the tuner and the other is inputted to the ¾ modulator in a standby state for a loop-out.

FIG. 2 is a block diagram showing an internal construction of the conventional RF switch.

As shown in FIG. 2, the conventional RF switch has such a structure that an RF signal is received from an external source, the RF signal of a terminal selected by a relay switch is amplified, and two same signals are outputted through a splitter.

The conventional RF switch will now be described in detail.

First, a power supply and relay switch adjusting interface 204 performs an interface control between a user and the relay switch, and supplies power to each part of the RF switch.

The relay switch 201 receives the RF signal, selects a received air RF signal or cable RF signal under the control of a relay switch adjusting unit 205 according to a user's selection, and outputs it to an amplifier 202.

Then, the amplifier 202 amplifies the air RF signal or cable RF signal outputted through the relay switch 201 to a predetermined level, and outputs it to the splitter 202.

The splitter 203 outputs the amplified RF signal simultaneously to the tuner and the ¾ modulator through a first output port and a second output port. At this time, the amplifier 202 not only compensates a signal attenuation phenomenon due to the relay switch 201 or the splitter 203 but also maintains a signal flatness according to a frequency in a broadband to its maximum. Thus, in measuring an infinitesimal signal receiving performance, a better performance is shown at a higher frequency.

However, in measuring a strong signal performance, the performance is degraded due to the amplifier 202, and in an area where an analog signal and a DTV signal having high signal strengths over broadband are received adjacently, or in a vicinity of a transmitting station, a distortion is generated in the amplifier 202, so that an image is broken or a specific channel is not taken. This is called an overload phenomenon of the amplifier 202. This phenomenon actually takes place in the North America, and in order to avoid such a phenomenon and the performance degradation in inputting a strong signal, several methods are used.

FIG. 3 is a block diagram showing an internal construction of the conventional RF switch for preventing a performance degradation in inputting a strong signal.

As shown in FIG. 3, the conventional RF switch for preventing a performance degradation has a structure that switches 302 and 304 are connected to input/output terminal of an amplifier 303 and a microcomputer 309 controls switching of the switches 302 and 304 through an input port 308, in addition to the structure of FIG. 2.

That is, the output of the relay switch 301 is outputted to the switch 302, and the switch 302 is switched under the control of the microcomputer 309 to output an inputted signal to the amplifier 303 or to the switch 304. Likewise, the switch 304 is switched under the control of the microcomputer 309 and selects a signal outputted from the amplifier 303 to output it to the splitter 305 or selects a signal outputted from the switch 302 to output it to the splitter 305.

In other words, according to the switching of the switches 302 and 304, the output of the relay switch 302 can be outputted to the splitter 305 through the amplifier 303 or directly bypassed to the splitter 305 without passing through the amplifier 303. Therefore, with the strong signal or the overload, the conventional RF switch as shown in FIG. 3 has a better performance than the conventional RF switch as shown in FIG. 2.

However, the switches 302 and 304 keeps operating in the vicinity of a threshold value adjusting a signal path which does not pass through the amplifier 303 and a signal path which passes through the amplifier 303. This causes a malfunction in the tuner, so that an image is broken even at a general signal or a non-image phenomenon occurs. Due to this phenomenon, the RF switch as shown in FIG. 3 is not used presently any longer.

In a different method for preventing the performance degradation caused by the RF switch as shown in FIG. 2, the amplifier is removed form the RF switch. This method shows a good performance over the strong or the overload, but since a signal attenuation according to the splitter is not compensated, an infinitesimal signal performance is not good.

In a still different method for preventing the performance degradation caused by the RF switch as shown in FIG. 2, an RF switch having an amplifier is used and in an area where a strong signal is generated, a user is recommended to install an attenuator at an input terminal of the RF switch. This method, however, has a problem that since there is a wide deflection in the signal strength depending on a channel or a direction of an antenna, it is not easy for the user to determine and control the signal performance.

SUMMARY OF THE INVENTION

Therefore, an object of the present invention is to provide an RF switch capable of enhancing a performance for a strong signal and an overload as well as a performance for an infinitesimal signal of a receiving unit by controlling power of an amplifier by using a Schmitt trigger circuit.

To achieve these and other advantages and in accordance with the purpose of the present invention, as embodied and broadly described herein, there is provided an RF switch including: a relay switch for selecting an RF signal inputted from an external source; an amplifier for amplifying the RF signal outputted from the relay switch to a predetermined level; and an amplifier power controller for turning on/off power of the amplifier.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An RF switch capable of enhancing a performance for a strong signal and an overload as well as a performance for an infinitesimal signal of a receiving unit by controlling power of an amplifier by using a Schmitt trigger circuit, in accordance with a preferred embodiment of the present invention will now be described with reference to the accompanying drawing.

Figure 1:
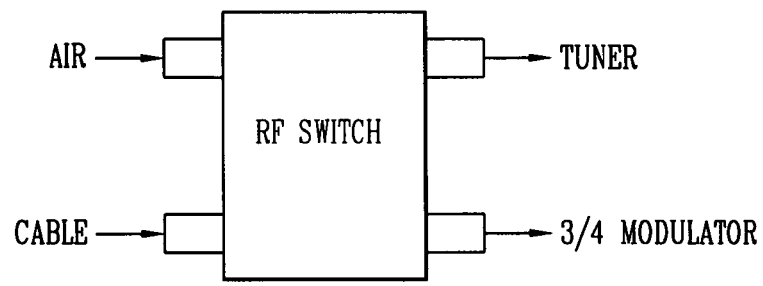
FIG. 1 is an exemplary view showing a general RF switch.
Figure 2:
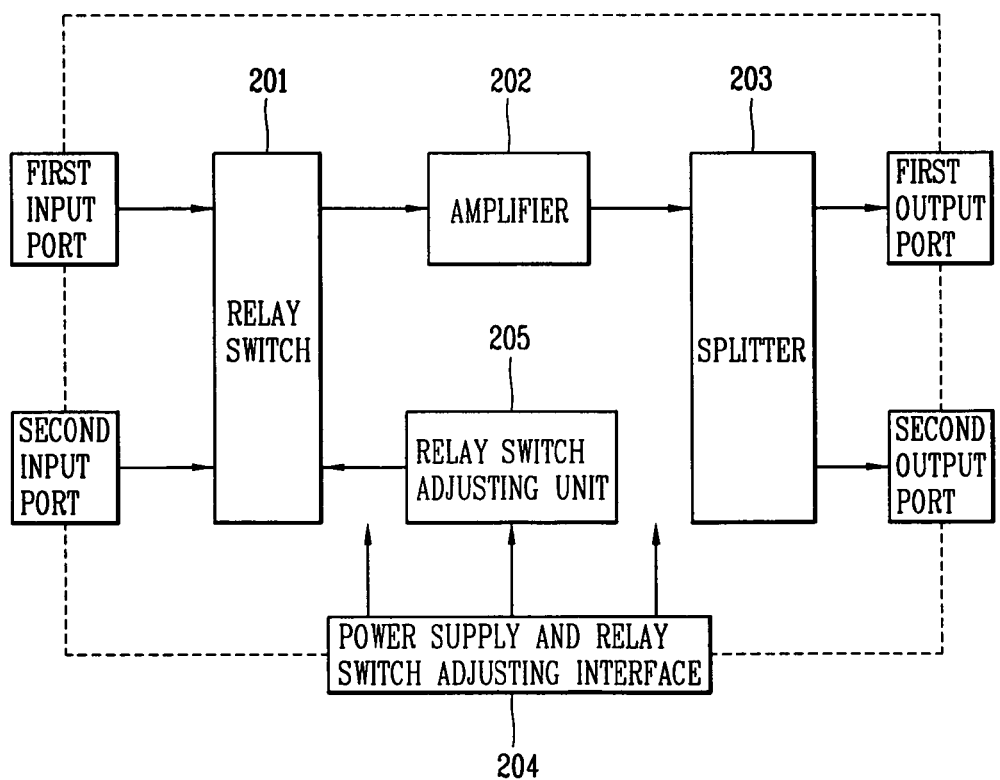
FIG. 2 is a block diagram showing an internal construction of an RF switch in accordance with one conventional art.
Figure 3:
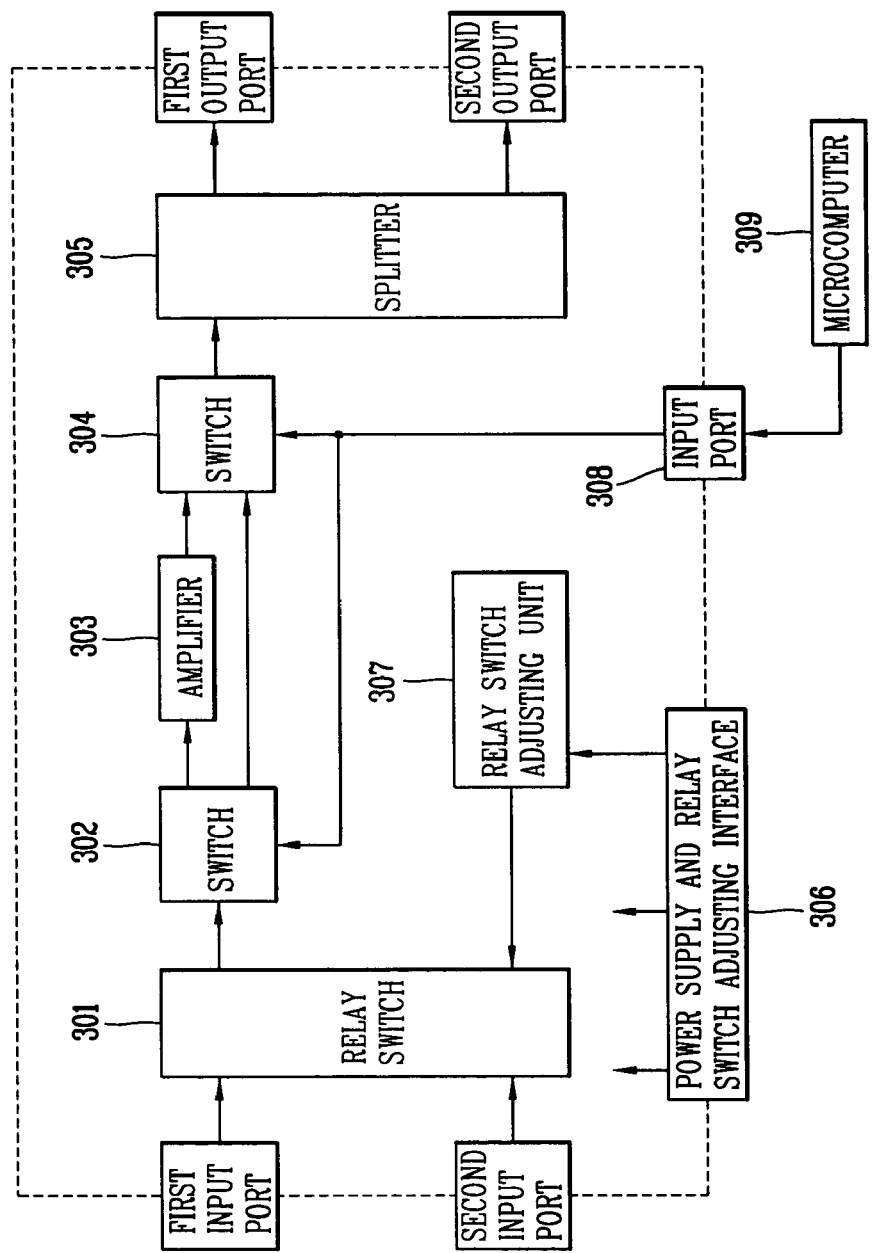
FIG. 3 is a block diagram showing an internal construction of an RF switch for preventing a performance degradation when a strong signal is inputted in accordance with another conventional art.
Figure 4:
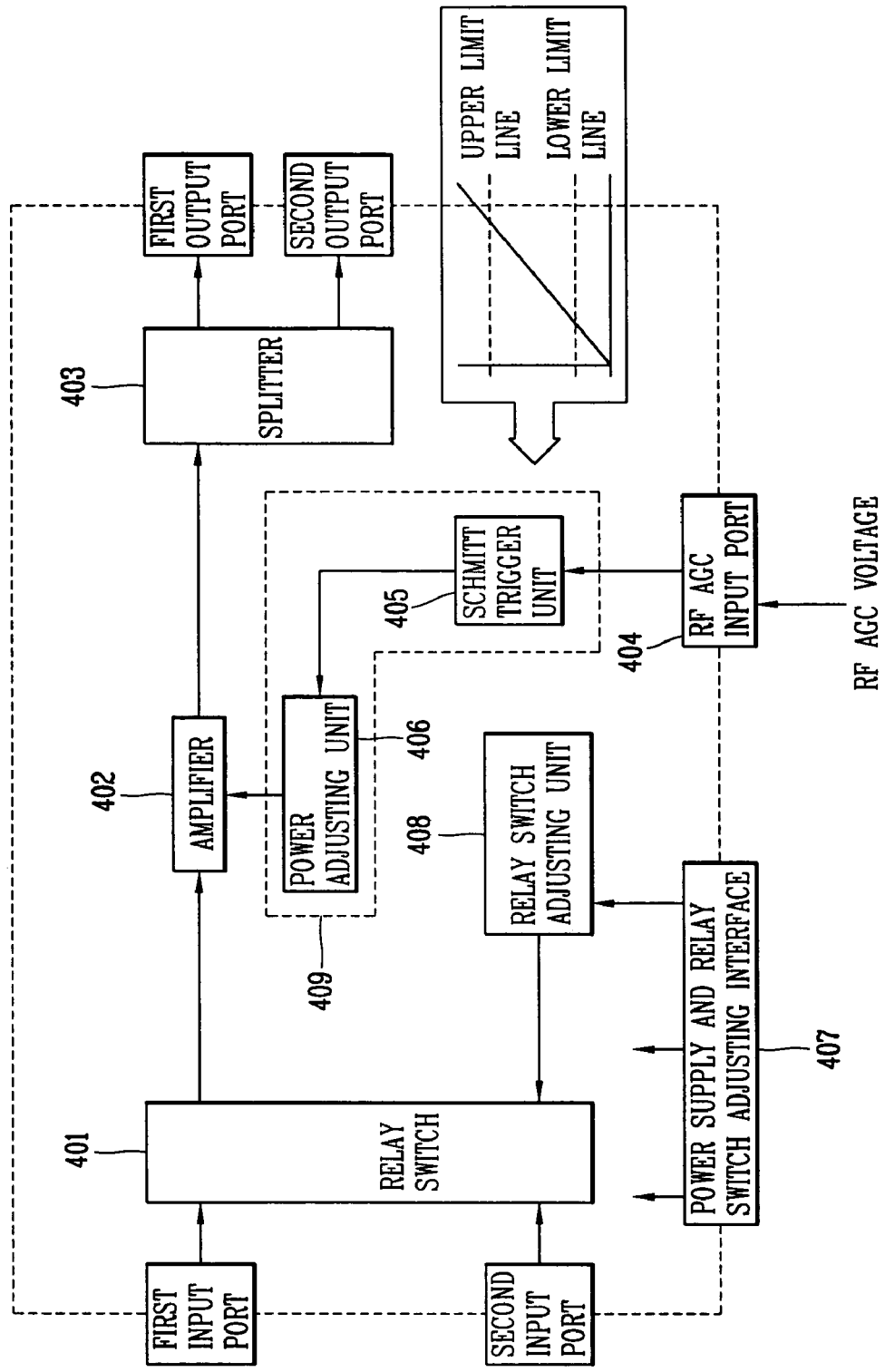
FIG. 4 is a block diagram showing an internal construction of an RF switch in accordance with the present invention.

FIG. 4 is a block diagram showing an internal construction of an RF switch in accordance with the present invention.

As shown in FIG. 4, the RF switch includes a power supply and relay switch adjusting interface 407 for performing an interface controlling between a user and a relay switch and supplying power to each part of the RF switch; a relay switch adjusting unit 408 for outputting a control signal for switching an RF signal inputted from an external source according to the interface controlling; a relay switch 401 switched to a first input port or to a second input port under the control of the relay switch adjusting unit 408 to select an air RF signal or a cable RF signal; an amplifier 402 being controlled in its power ON/OFF and amplifying an RF signal outputted from the relay switch 401 to a predetermined level only when power is ON; a splitter 403 for distributing an output of the amplifier 402 equally to two output terminals; and an amplifier power controller 409 for turning on/off power of the amplifier 402 according to an RF automatic gain controller (RF AGC) voltage of a tuner inputted through an input port 404 of an RF AGC.

The amplifier power controller 409 includes a Schmitt trigger unit 405 for outputting a power ON signal if the voltage of the RF AGC of the tuner inputted through the input port 404 is greater than a pre-set upper limit threshold value, and outputting a power OFF signal if the voltage of the RF AGC of the tuner inputted through the input port 404 is smaller than a pre-set lower limit threshold value; and a power adjusting unit 406 for turning on the amplifier 402 if the power ON signal is outputted from the Schmitt trigger unit 405, and turning off the amplifier 402 if a power OFF signal is outputted from the Schmitt trigger unit 405.

The operation of the RF switch constructed as described above will now be explained.

First, if the input terminal of the relay switch is switched to the first input port or to the second input port under the control of the relay switch adjusting unit 408, an air RF signal or a cable RF signal received from an external source is inputted to the amplifier 402 through the relay switch 401.

Then, the amplifier 402 is turned on or off under the control of the power adjusting unit 406. If the amplifier 402 is turned on, it amplifies the air RF signal or the cable RF signal outputted through the relay switch 401 to a predetermined level and outputs it to the splitter 403.

Upon receiving the amplified RF signal, the splitter 403 outputs it simultaneously to the tuner and to the ¾ modulator through the first output port and the second output port.

That is, if there are two output terminals, the amplifier RF signal is outputted both to the tuner and to the ¾ modulator.

The Schmitt trigger unit 405 receives an output voltage of the RF AGC of the tuner for controlling the size of the RF signal through the input port 404 of the RF AGC. In this respect, the voltage of the RF AGC of the tuner differs to a degree by models, but a voltage level is changed in the range of about 0V~4V by the strength of an inputted signal. Namely, if an infinitesimal signal is inputted, a voltage close to 4V is generated, and in case of a strong signal, a voltage close to 0V is generated.

For example, provided that the Schmitt trigger unit 405 is designed to have the upper limit threshold value of about 3V and a lower limit threshold value of about 1V, if a voltage level of the RF AGC of the tuner has a value of 3V or higher, the Schmitt trigger unit 405 outputs a signal for turning on the amplifier 402 to the power adjusting unit 406. Accordingly, the power adjusting unit 406 turns on the amplifier 402. Thus, by amplifying the RF signal outputted through the relay switch 401 by the amplifier 402, a capability for receiving the infinitesimal signal can be more improved.

If, however, the voltage of the RF AGC of the tuner is dropped to below 1V, the Schmitt trigger unit 405 outputs a signal for turning off the amplifier 402 to the power adjusting unit 405, which is then turns off the amplifier 402. Accordingly, since the amplifier 402 is turned off and serves as an attenuator, a capability of receiving a strong signal can become better.

In the Schmitt trigger unit 405, the upper limit threshold value and the lower limit threshold value should be set at optimum values in consideration of various environmental conditions and can be set in a wide range as possible in order not to cause an unnecessary conversion.

In addition, a reaction speed for switching power in the power adjusting unit 406, which adjusts the power of the amplifier, should be slower than that of the RF AGC of the tuner. By doing that, the receiving performance of the receiving unit can be improved over the overload causing a distortion of the amplifier by adjacent signal power of several channels as well as over a strong signal and an infinitesimal signal.

As so far described, the RF switch in accordance with the present invention has the following advantage.

That is, for example, the receiving performance of the receiving unit can be improved by adjusting power of the amplifier in the RF switch according to a voltage level of the RF AGC of the tuner through the Schmitt trigger circuit. That is, the performance for an infinitesimal signal and a strong signal can be more improved compared to the conventional art.

In addition, a signal distortion phenomenon that may occur when several signals with a high power level are adjacent can be avoided.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An RF switch comprising:
   a relay switch for selecting an RF signal inputted from an external source;
   an amplifier for amplifying the RF signal outputted from the relay switch to a predetermined level; and
   an amplifier power controller for turning on/off power of the amplifier,
   wherein the amplifier power controller further comprises a trigger unit for generating a control signal for turning on the amplifier if the output voltage of the RF AGC of the tuner is greater than a pre-set upper limit threshold value, and generating a control signal for turning off the amplifier if the output voltage of the RF AGC of the tuner is smaller than a pre-set lower limit threshold value; and a power adjusting unit for turning on or off the amplifier on the basis of the control signal of the trigger unit, and
   wherein a reaction speed of the power adjusting unit is slower than a reaction speed of the RF AGC of the tuner.

2. The RF switch of claim 1, wherein the amplifier power controller turns on/off the amplifier on the basis of an output voltage of an RF automatic gain controller (RF AGC) of a tuner for controlling a size of the RF signal.

3. The RF switch of claim 2, wherein if the output voltage of the RF AGC is greater than a pre-set upper limit threshold value, the amplifier power controller turns on the amplifier, whereas if the output voltage of the RF AGC is smaller than a pre-set lower limit threshold value, the amplifier power controller turns off the amplifier.

4. The RF switch of claim 1, wherein, in order to widen the range of a strength of a signal that can be received, if the amplifier power controller receives an infinitesimal signal, it turns on the amplifier to amplify the corresponding inputted RF signal, whereas if the amplifier power controller receives a strong signal, it turns off the amplifier to amplify the corresponding inputted RF signal.

5. The RF switch of claim 1, wherein the amplifier is disposed between the relay switch and the splitter for distributing an output of the amplifier equally to two output ports, and amplifies the RF signal only when power is ON.

6. The RF switch of claim 1 further comprising:
   a power supply and relay switch adjusting interface for performing an interface controlling between a user and a relay switch, and supplying power to each part of the RF switch; and
   a relay switch adjusting unit for outputting a control signal for converting an RF signal inputted from an external source according to the interface controlling.

7. The RF switch of claim 1 receives an air RF signal or a cable RF signal through the relay switch and outputs the RF signal outputted from the amplifier simultaneously to output ports through the splitter.

8. The RF switch of claim 7, wherein there are two output ports, and one RF signal is inputted to the tuner and the other RF signal is inputted to a ¾ modulator for a loop-out in a standby state.

9. An RF switch comprising:
   a relay switch for selecting an RF signal inputted from an external source;
   an amplifier being disposed between the relay switch and a splitter distributing the RF signal equally to output ports, amplifying the RF signal outputted from the relay switch to a predetermined level and outputs it to the splitter only when power is ON; and
   an amplifier power controller for receiving an output voltage of an RF AGC of a tuner, turning on the amplifier if the input voltage is greater than a pre-set upper limit threshold value, and turning off the amplifier if the input voltage is smaller than a pre-set lower limit threshold values,
   wherein the amplifier power controller further comprises a trigger unit for generating a control signal for turning on the amplifier if the output voltage of the RF AGC of the tuner is greater than a pre-set upper limit threshold value, and generating a control signal for turning off the amplifier if the output voltage of the RF AGC of the tuner is smaller than a pre-set lower limit threshold value, and a power adjusting unit for turning on or off the amplifier according to the control signal of the trigger unit, and
   wherein a reaction speed of the power adjusting unit is slower than a reaction speed of the RF AGC of the tuner.

* * * * *